United States Patent [19]

McGinniss et al.

[11] Patent Number: 5,331,018
[45] Date of Patent: Jul. 19, 1994

[54] BIMODAL CURED INTERMIXED POLYMERIC NETWORKS WHICH ARE STABLE AT HIGH TEMPERATURE

[75] Inventors: Vincent D. McGinniss, Sunbury; James L. White, Columbus, both of Ohio; Hiroyuki Mikuni, Sagamihara, Japan

[73] Assignee: Three Bond Co., Ltd., Tokyo, Japan

[21] Appl. No.: 935,863

[22] Filed: Aug. 26, 1992

[51] Int. Cl.$^5$ .................... C08F 2/50; C08F 18/14; C08F 18/18

[52] U.S. Cl. .................... 522/16; 522/40; 522/41; 522/42; 522/43; 522/44; 522/48; 522/59; 522/67; 522/31; 522/167; 522/175; 522/176; 522/178; 522/179; 522/182; 522/183; 522/184; 522/186; 522/187; 522/188

[58] Field of Search ............... 522/16, 182, 175, 179, 522/186, 188, 167, 183, 31, 44, 43, 42, 41, 40, 48, 59, 67, 173, 176, 178, 184, 187; 525/903

[56] References Cited

U.S. PATENT DOCUMENTS

| | | | |
|---|---|---|---|
| 4,025,407 | 5/1977 | Chang et al. | 522/142 |
| 4,128,600 | 12/1978 | Skinner et al. | 522/182 |
| 4,288,527 | 9/1981 | Morgan | 522/182 |
| 4,377,457 | 3/1983 | Boeckler et al. | 522/111 |
| 5,021,519 | 6/1991 | Varde et al. | 525/903 |
| 5,098,961 | 3/1992 | Pater | 525/903 |
| 5,169,902 | 12/1992 | Yagi et al. | 525/903 |

*Primary Examiner*—Susan Berman
*Attorney, Agent, or Firm*—Mueller and Smith

[57] ABSTRACT

The present invention is directed to a non-emissive, bimodal cured polymeric network which has an onset degradation temperature that is about 100° C. above the onset degradation temperature of a base polymer. The novel cured polymeric network comprises the cured reaction product of the following ingredients: (a) combination of one or more liquid carrier monomers or prepolymers which combination is reactive to form a base polymer by exposure to ultraviolet (UV) radiation in the presence of a UV photosensitizer at a temperature, $T_{uv}$; and (b) between about 10 and 100 wt-% based on ingredient (a) of a combination of one or more monomers or prepolymers which combination is reactive to form a cured high temperature stable polymer by heating at a temperature, $T_\Delta$. Ingredient (b) is soluble or dispersible in ingredient (a) at a temperature, $T_s$, wherein $T_s$ is equal to or lower than $T_{uv}$, and $T_{uv}$ is at least about 50° C. lower than $T_\Delta$.

15 Claims, No Drawings

BIMODAL CURED INTERMIXED POLYMERIC NETWORKS WHICH ARE STABLE AT HIGH TEMPERATURE

BACKGROUND OF THE INVENTION

The present invention relates to the synthesis of cured polymeric networks (e.g. films) that possess stability at elevated temperature (e.g. broadly above about 300° C., advantageously above 400° C., and preferably above 500° C.), and more particularly to the synthesis of such networks which are non-emissive during their cure.

A variety of high temperature polymers are known in the art, including, for example, polyimides, bismaleimides, polyphenylene sulfides, and the like. The high temperature stability of such polymers, in part, translates into high molecular weight which often makes such polymers solid at room temperature and/or difficult to solvate in conventional organic solvents such as those used in formulating coatings compositions. Such high temperature polymers, then, either must be heated at elevated temperature for application and/or solvated in solvents that present a hazard both in their handling during compounding of formulations containing such polymers and in containment of such solvents which are volatilized when the formulations are cured.

A variety of useful polymeric network-forming monomers, oligomers, and prepolymers, possess properties for making advantageous cured polymeric networks, but such networks degrade at temperatures making them unsuitable for a variety of uses which require exposure to elevated temperature, such as in the formulation of potting compounds, wire coatings, photoresists, and the like. The ability to enhance such useful polymeric systems for retaining their advantageous polymeric properties while enhancing their heat stability would find attraction in the marketplace, especially if such systems were made non-emissive. Non-emissive, for present purposes, comprehends the absence of evolution of organic components during cure of the formulation ingredients, but does not preclude the evolution of water during curing.

BROAD STATEMENT OF THE INVENTION

The present invention is directed to a non-emissive, bimodal cured polymeric network which has an onset degradation temperature that is about 100° C. above the onset degradation temperature of a base polymer. The novel cured polymeric network comprises the cured reaction product of the following ingredients: (a) combination of one or more liquid carrier monomers or prepolymers which combination is reactive to form a base polymer by exposure to ultraviolet (UV) radiation in the presence of a UV photosensitizer at a temperature, $T_{uv}$; and (b) between about 10 and 100 wt-% based on ingredient (a) of a combination of one or more monomers or prepolymers which combination is reactive to form a cured high temperature stable polymer by heating at a temperature, $T_\Delta$. Ingredient (b) is soluble or dispersible in ingredient (a) at a temperature, $T_S$, wherein $T_S$ is equal to or lower than $T_{uv}$, and $T_{uv}$ is at least about 50° C. lower than $T_\Delta$.

Advantages of the present invention include the ability to improve the thermal stability of a base polymer without detracting from its performance. Another advantage is the ability to formulate ingredients which can be cured to make such cured polymeric network wherein emission of organic ingredients is absent, i.e. a non-emissive polymeric network. A further advantage is the ability to formulate such polymeric networks utilizing a wide variety of classes of high temperature polymers. These and other advantages will be readily apparent to those skilled in the art based upon the disclosure contained herein.

DETAILED DESCRIPTION OF THE INVENTION

The base polymer possesses characteristics making it suitable for a wide variety of applications, such as a potting compound, sealant, coating, or the like; yet is limited in application due to its possessing an onset degradation temperature typically in the 100°–200° C. range. The base polymer is formed from a combination of one or more liquid carrier monomers or prepolymers, which combination is reactive by exposure to ultraviolet (UV) radiation in the presence of a UV photosensitizer to form the base polymer. The ingredients used in forming the base polymer need be "liquid" for present purposes under conditions maintained for UV cure, which conditions primarily reflect the temperature, $T_{UV}$, at which the UV photopolymerization takes place. Thus, it is entirely possible that the combination of ingredients forming the base polymer may require heating to $T_{UV}$ in order to liquefy such ingredients and for UV cure to proceed.

"Prepolymers" for present purposes comprehends oligomers or even polymers that are subject to additional reaction under conditions of cure (e.g. UV radiation in the case of the base polymer and heat in the case of the high temperature stable polymer) to form a cured network of higher molecular weight than the prepolymer reactants. Representative ingredients forming the base polymer include, for example, reactive vinyl monomers such as the lower alkyl esters of acrylic and methacrylic acids or polymers or prepolymers thereof. Vinyl monomers particularly adapted for photopolymerization include, for example, methyl methacrylate, ethyl methacrylate, 2-ethyl hexyl methacrylate, butyl acrylate, isobutyl methacrylate; the corresponding hydroxy acrylates, e.g., hydroxy ethyl acrylate, hydroxy propyl acrylate, hydroxy ethyl hexyl acrylate; also the glycol acrylates, e.g. ethylene glycol dimethacrylate, hexamethylene glycol dimethacrylate; the allyl acrylates, e.g. allyl methacrylate, diallyl methacrylate; the epoxy acrylates, e.g. glycidyl methacrylate; and the aminoplast acrylates, e.g. melamine acrylate. Other ingredients include diallylphthalate, vinyl acetate, vinyl and vinylidene halides, N-vinyl pyrrolidone, and amides, e.g. methyl acrylamide, acrylamide, diacetone acrylamide, butadiene, styrene, vinyl toluene, and the like, and mixtures thereof. A wide variety of additional compounds may be used in forming the base polymer as those skilled in the art will appreciate.

Ultraviolet photosensitizers or sensitizers are combined with the monomers or prepolymers used to form the base polymer for achieving cure in the presence of UV radiation. Useful UV sensitizers or photosensitizers include halogenated polynuclear ketones such as disclosed in U.S. Pat. No. 3,827,957; and organic carbonyl compounds selected from alkyl phenones, benzophenones, and tricyclic fused ring compounds as disclosed in U.S. Pat. No. 3,759,807. Further useful UV sensitizers include carbonylated phenol nuclear sulfonyl chlorides, such as set forth in U.S. Pat. No. 3,927,959. Additional useful photosensitizer combinations particularly suited for pigmented formulations are a combination of sensitizers comprising aromatic carbonyl compounds, aromatic aldehydes or aromatic ketones, and a synergistic sensitizer of about 0.05% to about 3% of 2,2'-dithiobis(benzothiazole), as set forth in U.S. Pat. No. 3,847,771. Typically, at least about 0.5% by weight of the UV sensitizer, and preferably about 1–5% sensitizer, is added to the ingredients and thoroughly mixed or otherwise dispersed in the liquid carrier ingredients.

The base polymer will have its onset degradation temperature increased by at least about 100° C. by virtue of the incorporation of from between about 10% and 100% by weight based on the base polymer of a combination of one or more monomers or prepolymers, which combination is reactive to form a cured high temperature stable polymer by heating at a temperature, $T_A$. The onset degradation temperature of the cured high temperature stable polymer, which is at least about 100° C. higher than that of the base polymer, broadly is at least about 300° C., advantageously, about 400° C., and preferably above about 500° C. The high temperature stable polymer is formed from a combination of monomers or prepolymers, with the "prepolymer" definition given above appropriate here for heat curing at $T_A$.

Typically, prepolymers will be used in forming the high temperature stable polymer and a substantial fraction of such prepolymers are solid at room temperature. Accordingly, the combination of ingredients used in forming the high temperature stable polymer are soluble or dispersible in the base polymer ingredients at a temperature, $T_S$. $T_S$ necessarily, is equal to or lower than $T_{UV}$. In order for the bimodal cure to proceed, $T_{UV}$ is about 50° C. lower than $T_A$ with this temperature differential being easy to implement commercially. The cured high temperature stable polymer imparts improved heat stability to the base polymer without unduly compromising the performance properties of the base polymer which were desired in the initial instance.

A wide variety of classes of high temperature polymers can be formed in accordance with the precepts of the present invention with their corresponding monomers or prepolymers being used in their formation. such classes of high temperature polymers include, for example, polyimides, bismaleimides, polyesters, polycarbonates, phenolics, polyphenylene sulfides and sulfones, polyphenyl ethers, polyquinones, cyanate polymers, and inorganic polymers such as silicones and other non-carbon backbone polymers, and the like, and mixtures thereof. It is possible that a prepolymer which is reacted to form a cured high temperature stable polymer itself might be in situ formed during the UV step of the reaction, with subsequent heating at $T_A$ required in order for final formation of the cured high temperature stable polymer. Such prepolymer also might be formed by exposure of the ingredients to temperature $T_{UV}$.

Representative reaction schemes which can be used to form prepolymers reactive to form cured high temperature stable polymers include, for example, the formation of polyimides by the reaction of a dianhydride with a diprimary amine to form a hydroxyamic ester prepolymer which then can be cured at temperature, $T_A$, to form the final polyimide. Suitable diamines include, for example, diaminobenzophenone, diaminoanthraquinone, diaminonaphthalene, diaminoalkanes, and diaminobenzenes; while suitable dianhydrides include, for example, benzophenone dianhydride, diphenyloxy dianhydride, diphenylmethylene dianhydride, and pyromellitic dianhydride. Blocking of the amine or dianhydride groups for stability also can be practiced in this mode of the invention. Additionally, amine-functional silicone resins can be modified with maleic anhydride or blocked with methyl ethyl ketone and used as intermediates for bismaleimide or polyimide resin formation. Bismaleimides additionally can be cured by free radical mechanisms (phenolic resins), mercaptans, and amines (blocked and unblocked). Polysulfide resins can be formed in situ, e.g., by the reaction of diphenyl ethers with phenyl disulfide.

The foregoing are but a few representative reaction schemes with a variety of additional schemes being disclosed and implemented in the Examples.

The formulations optionally can be pigmented with opacifying pigments (e.g. titanium dioxide); tinctorial pigments; additives, including leveling agents, stabilizers, anticratering agents, anti-oxidants, and the like; or rendered conductive by the incorporation of graphite particles, for example. The final contemplated application of the polymeric network will dictate the precise formulations. Importantly, the formulations do not require the presence of organic solvents which will be evaporated or discharged from the ingredients upon their curing.

In practicing the present invention, the ingredients are mixed and then formed into a coating (e.g., around a wire for a wire coating or on a circuit board as a photoresist), poured into a mold for use as a potting compound, or the like. The ingredients may require heating to temperature, $T_S$, in order for the high temperature stable polymer-forming ingredients to be soluble or dispersible in the liquid carrier ingredients. For that matter, heat may be required in order for the carrier ingredients to be liquid also. Regardless of the heating requirements, the formulation is heated to temperature, $T_{UV}$, whereupon the formulation is exposed to UV radiation.

Typical sources of ultraviolet energy ordinarily produce wavelengths in the ultraviolet spectrum that are transmitted through quartz, and such wavelengths are usually between about 1,000 A and 4,000 A. Suitable ultraviolet emitters include various electric arc lamps, plasma arc torches, such as described in U.S. Pat. No. 3,364,487, and lasers having a lasing output in the ultraviolet spectrum. Other suitable sources actinic light include, for example, quartz mercury lamps, ultraviolet quartz lamps, and high flash lamps.

Following application of UV radiation, the partially cured formulation then is subjected to additional heating at temperature, $T_A$, which is at least about 50° C. higher than $T_{UV}$ wherein the final formation of the high temperature stable polymer is achieved. Once the cure has been achieved, heating is ceased and the polymeric network cooled. As stated above, the cured polymeric network will find application as a coating, e.g. for a wire; as a potting compound; as a photoresist, and a variety of additional uses. As a coating, application to metals, plastics, ceramics, and a variety of additional substrates is appropriate.

The following examples show how the present invention can be practiced, but should not be construed as limiting the invention. In the specification, all parts are parts by weight, all percentages are weight percentages, all temperatures are in degrees Centigrade, and all units are in the metric system, unless otherwise expressly indicated. Also, all references cited herein are expressly incorporated herein by reference.

IN THE EXAMPLES

General Experimental Procedure

The ingredients of the various formulations were combined and mixed together using conventional stirring/mixing methods. The sample coating formulations were drawn down onto steel panels with a number 20 wire wound rod or equivalent, and cured using a 275 watt General Electric sun lamp and a thermal convection oven. Cure was determined using a solvent rub test where the solvent was N-methyl pyrrolidone (NMP). A coating that passed greater than 50 double rubs was considered cured. The thermal analysis response of the coatings was determined using a Perkin-Elmer 7-series thermal mechanical analyzer system (Thermogravimetric analysis or TGA).

| Ingredients/Abbreviations Used | |
|---|---|
| HEA | Hydroxyethyl acrylate |
| HBA | Hydroxybutyl acrylate |
| MEK | Methylethyl ketone |
| HEMA | Hydroxyethyl methacrylate |
| Compimide 796 | Heat curable, fully imidized bismaleimide resin, Shell Chemical Co. |

EXAMPLE 1

Coatings were prepared from hydroxyethyl acrylate or hydroxybutyl acrylate diesters of oxydiphthalic anhydride and methylethyl ketone blocked 1,5-diaminonaphthalene in various reactive carrier solvents, and the coatings evaluated for their performance. The following table sets forth the formulations used, the cure schedules followed, and the results obtained.

TABLE 1

| | FORMULATIONS 46028-(wt-parts) | | | | | | | | | | |
|---|---|---|---|---|---|---|---|---|---|---|---|
| | Control A | Control B | Control C | Control 99-1 | 59-5 | 59-5R | 87-1 | 86-1 | 94-1 | 93-1 | 98-1 |
| Ingredient | | | | | | | | | | | |
| HEA Diester of Oxydiphthalic Anhydride (4-27B) | — | — | — | — | 10.6 | 10.6 | — | — | — | — | — |
| HEA Diester of Oxydiphthalic Anhydride (85-1) | — | — | — | — | — | — | 13.1 | 12.2 | — | — | — |
| HEA Diester of Oxydiphthalic Anhydride (88-1)[a] | — | — | — | 17.7 | — | — | — | — | 15.1 | 14.4 | 17.3 |
| 1,5-Diaminonaphthalene | — | — | — | — | 3.2 | 3.2 | — | — | — | — | — |
| MEK Blocked 1,5-Diaminonaphthalene | — | — | — | — | — | — | 6.4 | 6.0 | 5.7 | 5.3 | 6.5 |
| Glyceryl Propoxytriacrylate | 8.9 | — | — | 6.5 | — | — | 6.5 | — | 6.4 | — | — |
| N-Vinyl Pyrrolidone | 9.0 | — | — | — | 85.1 | 85.1 | 72.0 | — | 70.9 | — | — |
| DY023 Mono-epoxy | — | 70 | — | — | — | — | — | 61.1 | — | 60.0 | — |
| RD-2 Di-epoxy | — | 20 | — | — | — | — | — | 12.2 | — | 12.0 | — |
| PY 306 Bisphenol F Epoxy | — | 7.6 | — | — | — | — | — | 6.1 | 6.0 | — | — |
| Diallyl Phthalate | — | — | 48 | — | — | — | — | — | — | — | 74.0 |
| HEMA Modified Phosphazene | — | — | 50 | 73.6 | — | — | — | — | — | — | — |
| Irgacure 651 | 1.1 | — | 2 | 2.2 | 1.1 | 1.1 | 2.0 | — | 1.9 | — | 2.2 |
| Cyracure UVI-6974 | — | 2.4 | — | — | — | — | — | 2.4 | — | 2.4 | — |
| Cure Conditions/Results | | | | | | | | | | | |
| UV Sun lamp Cure Schedule (min) | | | | | | | | | | | |
| Hot Plate Temp. (149° C.) | 30 | 30 | 30 | 15 | 30 | — | 15 | 20 | 15 | 20 | 15 |
| 50 NMP Rubs[c] | P | P | P | P | F | P[b] | P | P | P | P | P |
| Thermal Cure (min) | | | | | | | | | | | |
| Oven at 232° C. | 60 | 60 | 60 | 60 | — | 60 | 60 | 60 | 60 | 60 | 60 |
| Oven at 288° C. | 30 | 30 | 30 | 30 | — | 30 | 30 | 30 | 30 | 30 | 30 |
| TGA Onset Degradation Temp. (°C.) | 90–100 | 200–400 | 200 | 327.5 | 149.5 | 300.3 | 341.3 | 330.4 | 334.0 | 335.4 | 347.6 |
| | — | — | — | — | 542.1 | 543.5 | 558.0 | 475.8 | 554.5 | 505.9 | 561.8 |

[a]Diester has 16.7% excess HBA added to help solvate the oxydiphthalic anhydride during preparation.
[b]Tested after bake schedule.
[c]F = Failed; P = Pass.

| Ingredients/Abbreviations Used | |
|---|---|
| PS 513 | Polydimethyl siloxane, amino propyl dimethyl terminated (MW 27,000), Huls Petrarch Corp., Bristol, Pa. |
| GP-145 | Polydimethyl siloxane, amino propyl methyl-ethanol terminated (MW 18,000), Genesee Polymers Corp., Flint, Mi. |
| PS510 | Polydimethyl siloxane, amino propyl dimethyl terminated (MW 2,500), Huls-Petrarch Corp. |
| B1175 | 1,4-Bis(3-amino propyldimethyl silyl) benzene, Huls-Petrarch Corp. |
| PS558 | Monocarbinol-terminated polydimethyl siloxane, Huls-Petrarch Corp. |
| B1710 | 1,3-Bis(amino propyl) 1,1,3,3-tetramethyl disiloxane, Huls-Petrarch Corp. |
| Irgacure 651 | Ketal of benzil photoinitiator, Ciba Geigy Co. |
| Cyracure UVI-6974 | $\phi_3S^+SbF_6^-$ cationic photoinitiator, Union Carbide Corp. |
| DY023 | Cresyl glycidyl ether, Ciba Geigy Co. |
| PY306 | Bisphenol F epoxy, Ciba Geigy Co. |
| RD-2 | 1,4-Butanediol diglycidyl ether, Ciba Geigy Co. |

The above-tabulated results clearly demonstrate that the inventive bimodal cured system provides high temperature stability compared to the Control systems which involved but a single cured network. Formulation 99-1 involved a dual bake system of unsaturated ingredients only which provided high temperature stability, albeit not as high as the polyimide resin-forming systems. Polyimide resins inherently usually posses better high temperature stability than the acrylic resins evaluated above and were achieved in situ by a combination of UV and thermal cure.

EXAMPLE 2

Polyester polymers were evaluated by preparing coatings from 4-acetoxybenzoic acid with 4,4'-biphenol or diacetate liquid reactive carriers therefor. The following table sets forth the formulation prepared, the cure schedule followed, and the results obtained.

TABLE 2

| FORMULATION 46028-(wt-parts) | | |
| --- | --- | --- |
|  | 61-2 | 62-3 |
| Ingredient | | |
| 4-Hydroxybenzoic Acid | 14.6 | 15.5 |
| 4,4'-Biphenol | 15.6 | — |
| Resorcinol Diacetate | — | 10.4 |
| Glyceryl Propoxy Triacrylate | 9.8 | 10.4 |
| N-Vinyl Pyrrolidone | 58.5 | 62.2 |
| Irgacure 651 | 1.5 | 1.5 |
| Cure Conditions/Results | | |
| UV Sun lamp Cure Schedule (min)* | | |
| Hot Plate Temp. (149° C.) | 30 | 30 |
| Thermal Cure (min) | | |
| Oven at 232° C. | 60 | 60 |
| Oven at 288° C. | 30 | 30 |
| TGA Onset Degradation | 200 | 246 |
| Temperature (°C.) | 495.1 | 501.4 |

*Coating cured after UV exposure.

The above tabulated results demonstrate the invention for polyester polymers by demonstrating excellent high temperature stability.

EXAMPLE 3

Amine-functional silicone resins can be modified with maleic anhydride or blocked with MEK, and used as intermediates for bismaleimide or polyimide resin in situ formation. The following table sets forth the formulation prepared, the cure schedule followed, and the results obtained.

TABLE 3

| FORMULATION 46028-(wt-parts) | | | |
| --- | --- | --- | --- |
|  | 100-1 | 100-2 | 100-3 |
| Ingredient | | | |
| HBA Diester of Oxydiphthalic Anhydride (88-1) | 21.5 | — | — |
| MEK Blocked 1,5-Diamino-naphthalene (6-22) | 10.3 | — | — |
| GP-145 Silicone Resin | 64.4 | 95.2 | 94.3 |
| Maleic Anhydride | 0.6 | — | 0.9 |

TABLE 3-continued

| FORMULATION 46028-(wt-parts) | | | |
| --- | --- | --- | --- |
|  | 100-1 | 100-2 | 100-3 |
| Irgacure 651 | 3.2 | 4.8 | 4.8 |
| UV Sun lamp Cure Schedule (min)* | | | |
| Hot Plate Temp. (149° C.) | 15 | 15 | 15 |
| Thermal Cure (min) | | | |
| Oven at 232° C. | 60 | 60 | 60 |
| Oven at 288° C. | 30 | 30 | 30 |
| TGA Onset Degradation | 457.0* | 395.2 | 420.2 |
| Temperature (°C.) | — | 504.6 | 537.5 |

*Rubber-like coating.

These data establish the in situ formation of imide coatings in accordance with the bimodal curing scheme of the present invention. Yet, again, excellent high temperature stability has been reported to be possessed by the inventive coatings.

EXAMPLE 4

Additional formulations based on 4-hydroxybutyl acrylate diesters of oxydiphthalic anhydride were compounded and evaluated as described above. The following table sets forth the formulation prepared, the cure schedule followed, and the results obtained.

TABLE 4

| FORMULATION 46028-(wt-parts) | | | | | |
| --- | --- | --- | --- | --- | --- |
|  | 1-3 | 5-2 | 9-1 | 9-2 | 30-1 |
| Ingredient | | | | | |
| HBA Diester of Oxydiphthalic Anhydride | 21.46 | 21.74 | 37.74 | 36.36 | 37.74 |
| GP-145 Silicone Resin | 64.38 | — | — | — | — |
| PS510 Silicone Resin | — | 65.22 | 37.74 | 36.36 | 37.74 |
| MEK-Blocked 1,3-Bis(3-Aminopropyl) 1,1,3,3-Tetramethyl Siloxane | — | — | 22.64 | — | — |
| MEK-Blocked 1,4-Bis(3-Aminopropyl Dimethyl Silyl) Benzene | — | — | — | 25.46 | — |
| MEK-Blocked 1,5-Diaminonaphthalene | 10.3 | 9.78 | — | — | 20.76* |
| Maleic Anhydride | 0.64 | — | — | — | — |
| Irgacure 651 | 3.22 | 3.26 | 1.89 | 1.82 | 3.77 |
| Cure Conditions/Results | | | | | |
| UV Sun lamp Cure Schedule (min) | | | | | |
| Hot Plate Temp. (23° C.) | — | — | — | — | 30 |
| Hot Plate Temp. (121° C.) | — | — | 15 | 15 | — |
| Hot Plate Temp. (149° C.) | 15 | 15 | — | — | — |
| Thermal Cure (min) | | | | | |
| Oven at 232° C. | 60 | 60 | 60 | 60 | 60 |
| NMP Resistance | >50 | >50 | Slight Removal at 50 | Trace Removal at 50 | >50 |
| TGA Onset Degradation Temperature (°C.) | | | | | |
| After UV Cure | 425.0 | 422.9 | 395.1 | 400.1 | 143.2–481.7 |
| After Oven Bake | 425.8 | 4001. | 385.4 | 382.3–392.1 | 335.2–513.2 |

The above-tabulated results further demonstrate the ability to prepare high temperature stable polymers by the bimodal cure scheme of the present invention.

EXAMPLE 5

Formulations based on HEA or HBA/silicone diesters of oxydiphthalic anhydride were compounded and evaluated as described above. The following table sets forth the formulation prepared, the cure schedule followed, and the results obtained.

TABLE 5

| FORMULATION 46028-(wt-parts) | | |
| --- | --- | --- |
|  | 2-3 | 21-1 |
| Ingredient | | |
| HEA Diester of Oxydiphthalic Anhydride | 21.55 | — |
| Maleic end capped GP-145 Silicone Resin | 64.66 | — |
| MEK-Blocked 1,5-Diaminonaphthalene | 10.56 | — |

TABLE 5-continued

| FORMULATION 46028-(wt-parts) | 2-3 | 21-1 |
|---|---|---|
| HBA/PS588 Diester of Oxydiphthalic Anhydride (54% in NMP) | — | 30.20 |
| MEK-Blocked 1,3-Bis(3-aminopropyl) 1,1,3,3-tetramethyl disiloxane | — | 19.48 |
| Maleic end capped PS510 (MW 2,500) | — | 32.47 |
| HBA Diester of Oxydiphthalic Anhydride | — | 16.23 |
| Irgacure 651 | 3.23 | 1.62 |
| Cure Conditions/Results | | |
| UV Sun lamp Cure Schedule (min)* | | |
| Hot Plate Temp. (149° C.) | 15 | — |
| Hot Plate Temp. (177° C.) | — | 15 |
| Thermal Cure (min) | | |
| Oven at 232° C. | 60 | 60 |
| NMP Resistance | >50 | 100% Removal at 50 |
| TGA Onset Degradation Temperature (°C.) | 433.8 417.1 | 359.8 361.2 |

The above tabulated results demonstrate the invention for silicone polymers by demonstrating excellent high temperature stability.

EXAMPLE 6

Formulations based on octyl alcohol diesters of oxydiphthalic anhydride were compounded and evaluated as described above. The following table sets forth the formulation prepared, the cure schedule followed, and the results obtained.

TABLE 6

| FORMULATION 46028-(wt-parts) | 27-1 | 28-1 |
|---|---|---|
| Ingredient | | |
| Octyl Alcohol Diester of Oxydiphthalic Anhydride | 18.66 | 16.06 |
| HBA Diester of Oxydiphthalic Anhydride | 18.66 | — |
| MEK-Blocked 1,3-Bis(3-aminopropyl) 1,1,3,3-tetramethyl disiloxane | 22.39 | 13.28 |
| HBA/PS588 Diester of Oxydiphthalic Anhydride (54% in NMP) | — | 29.55 |
| Maleic end capped PS510 (MW 2,500) | 37.31 | 38.97 |
| Irgacure 651 | 2.99 | 2.14 |
| Cure Conditions/Results | | |
| UV Sun lamp Cure Schedule (min)* | | |
| Hot Plate Temp. (121° C.) | 15 | 15 |
| Thermal Cure (min) | | |
| Oven at 232° C. | 60 | 60 |
| NMP Resistance | Trace Removal at 50 | 60% Removal at 50 |

TABLE 6-continued

| FORMULATION 46028-(wt-parts) | 27-1 | 28-1 |
|---|---|---|
| TGA Onset Degradation Temperature (°C.) | 372.7–490.4 362.7–492.6 | 204.8–395.1 476.7–478.4 |

The above tabulated results demonstrate the invention for silicone polymers by demonstrating excellent high temperature stability.

EXAMPLE 7

Additional formulations based on octyl alcohol diesters of oxydiphthalic anhydride were compounded and evaluated as described above. The following table sets forth the formulation prepared, the cure schedule followed, and the results obtained.

TABLE 7

| FORMULATION 46028-(wt-parts) | 32-1 | 33-1 | 33-2 |
|---|---|---|---|
| Ingredient | | | |
| Octyl Diester of Oxydiphthalic Anhydride | 35.0 | 33.3 | 34.1 |
| MEK Blocked B1710 Silicone | 10.8 | 10.3 | — |
| MEK Blocked 1,5-Diaminonaphthalene | 8.4 | 8.0 | 16.4 |
| Diallyl Phthalate | 31.5 | 16.7 | 17.1 |
| Triallyl Trimelliate | — | 16.7 | 17.1 |
| Pentaerythritol Tetrathioglycolate | 9.1 | 10.0 | 10.2 |
| Irgacure 651 | 5.2 | 5.0 | 5.1 |
| UV Sun lamp Cure Schedule (min)* | | | |
| Hot Plate Temp. (121° C.) | 15 | — | — |
| Hot Plate Temp. (149° C.) | — | 15 | 15 |
| Thermal Cure (min) | | | |
| Oven at 232° C. | 60 | 60 | 60 |
| TGA Onset Degradation Temperature (°C.) | | | |
| After UV Cure | 157.8 295.9 584.3 | 172.1 298.7 621.2 | 156 280.4 553.5 |
| After Oven Cure | 295.1 575.5 | 292.8 580.8 | 283.7 565.8 |

Again, the invention is demonstrated for additional polymer tapes.

EXAMPLE 8

Formulations based on phenyl disulfide/4,4'-dibromodiphenyl ether in UV curable reactive monomers were compounded and evaluated as described above. The following table sets forth the formulation prepared, the cure schedule followed, and the results obtained.

TABLE 8

| FORMULATION 46028-(wt-parts) | Control 38-1 | Control 38-2 | 34-1 | 34-1-1 | 34-2 | 35-1 | 36-1 | 37-1 |
|---|---|---|---|---|---|---|---|---|
| Ingredient | | | | | | | | |
| Phenyl Disulfide | — | — | 5.26 | 5.26 | 7.87 | 5.75 | 7.14 | 12.2 |
| 4,4'-Dibromodiphenyl Ether | — | — | 10.53 | 10.53 | 7.87 | 11.49 | 14.29 | 24.39 |
| Diallyl Phthalate | 37.5 | — | 31.58 | 31.58 | 31.50 | — | — | 23.41 |
| Triallyl Trimelliate | 37.5 | — | 31.58 | 31.58 | 31.50 | — | — | 23.41 |
| Pentaerythritol Tetrathioglycolate | 22.5 | — | 18.95 | 18.45 | 19.00 | — | — | 14.15 |
| N-Vinyl Pyrrolidone | — | — | — | — | — | 68.97 | — | — |
| Glyceryl Propoxytriacrylate | — | — | — | — | — | 11.49 | — | — |
| Cresyl Glycidyl Ether (DY023) | — | — | — | — | — | — | 42.86 | — |
| Bisphenol F Epoxy (PY306) | — | — | — | — | — | — | 14.29 | — |
| 1,4-Butanedioldiglycidyl Ether (RD-2) | — | — | — | — | — | — | 17.86 | — |
| Irgacure 651 | 2.5 | — | 2.10 | 2.10 | 2.36 | 2.30 | — | 2.44 |
| Cyracure UVI-6974 | — | — | — | — | — | — | 3.57 | — |
| Polyphenylsulfide* | — | 100 | — | — | — | — | — | — |
| Cure Conditions/Results | | | | | | | | |

TABLE 8-continued

| | FORMULATION 46028-(wt-parts) | | | | | | | |
|---|---|---|---|---|---|---|---|---|
| | Control 38-1 | Control 38-2 | 34-1 | 34-1-1 | 34-2 | 35-1 | 36-1 | 37-1 |
| UV Sun lamp Cure Schedule (min) | | | | | | | | |
| Hot Plate Temp. (54° C.) | — | — | — | 15 | — | — | — | 15 |
| Hot Plate Temp. (77° C.) | 30 | — | — | — | — | — | — | — |
| Hot Plate Temp. (121° C.) | — | — | 15 | — | 15 | 15 | 15 | — |
| Thermal Cure (min) | | | | | | | | |
| Oven at 93° C. | — | — | — | — | — | — | — | 30 |
| Oven at 232° C. | — | — | 60 | — | 60 | — | — | — |
| Oven at 288° C. | — | — | — | 60 | — | 60 | 60 | — |
| TGA Onset Degradation Temp. (°C.) | | 541.5* | | | | | | |
| After UV Cure | 269.7 | — | 264.3 | — | 261.7 | — | — | 174.7 |
| | | | 506.3 | — | 508.3 | — | — | 498.1 |
| After Oven Cure | — | — | 268.5 | 327.8 | 273.3 | 335.5 | 330.6 | 236.9 |
| | | | | | | | | 485.9 |

*Inherent degradation temperature of Radel A-100 NT polyphenylsulfide, Amoco Chemical Co.

The above-tabulated results demonstrates the ability to in situ form a polyphenylsulfide polymer for providing a high temperature stable coating composition. Formulation 37-1 with higher polyphenylsulfide-forming ingredients displayed the best high temperature stability.

EXAMPLE 9

Formulations based on either anthraquinone/pyromellitic dianhydride or dibromodiphenyl ether/sodium sulfide in UV curable reactive monomers were compounded and evaluated as described above. The following table sets forth the formulation prepared, the cure schedule followed, and the results obtained.

TABLE 9

| | FORMULATION 46028-(wt-parts) | | |
|---|---|---|---|
| | 41-1 | 41-1-1 | 42-1 |
| Ingredient | | | |
| Anthraquinone | 7.85 | 7.85 | — |
| Pyromellitic Dianhydride | 7.85 | 7.85 | — |
| N-Vinyl Pyrrolidone | — | — | 61.04 |
| Glyceryl Propoxy Triacrylate | — | — | 10.17 |
| Diallyl Phthalate | 31.42 | 31.42 | — |
| Triallyl Trimelliate | 31.41 | 31.41 | — |
| Pentaerythritol Tetrathioglycolate | 18.85 | 18.85 | — |
| Dibromodiphenyl Ether | — | — | 10.17 |
| 4-Bromophenol | — | — | 2.65 |
| $Na_2S \cdot 9H_2O$ | — | — | 9.36 |
| $Na_2CO_3$ | — | — | 4.07 |
| Irgacure 651 | 2.62 | 2.62 | 2.54 |
| UV Sun lamp Cure Schedule (min) | | | |
| Hot Plate Temp. (138° C.) | 15 | 15 | 15 |
| Thermal Cure (min) | | | |
| Oven at 232° C. | 60 | — | — |
| Oven at 288° C. | — | 60 | 60 |
| TGA Onset Degradation Temperature (°C.) | | | |
| After UV Cure | 233.2 | 233.2 | 221.1 |
| After Oven Cure | 301.0 | 331.9 | 349.0 |

The above-tabulated results once again demonstrate the present invention. In particular, it appears that the slightly higher oven bake of Formulation 41-1 resulted in a slightly higher onset degradation temperature. Both formulations, however, displayed excellent high temperature stability.

We claim:

1. A non-emissive, bimodal-cured, polymeric network which has an onset degradation temperature that is about 100° C. above the onset degradation temperature of a base polymer, and which is the cured reaction product of a mixture of the following ingredients:

(a) a combination of one or more liquid carrier monomers or prepolymers which combination is firstly reacted to form said base polymer by exposure of said mixture to ultraviolet (UV) radiation in the presence of a UV photosensitizer at a temperature, $T_{uv}$; and (b) between about 10 and 100 wt-% based on ingredient (a) of a combination of one or more monomers or prepolymers which combination is secondly reacted by heating of said mixture at a temperature, $T_\Delta$, to form a cured high temperature stable polymer having an onset degradation temperature at least about 100° C. higher than that of said base polymer, at least one of said monomers or prepolymers forming said cured high temperature stable polymer being modified or blocked to be unreactive at temperatures below about $T_\Delta$ and selected from the group consisting of blocked amine monomers, blocked anhydride monomers, blocked dianhydride monomers, blocked alcohol monomers, and amine-functional silicone resins modified with a maleic anhydride or blocked with a methyl ethyl ketone, wherein ingredient (b) is soluble or dispersible in ingredient (a) at a temperature, $T_s$, wherein $T_s$ is equal to or lower than $T_{uv}$, and $T_{uv}$ is at least about 50° C. lower than $T_\Delta$.

2. The polymeric network of claim 1, wherein said liquid carrier monomers or prepolymers (a) comprise one or more vinyl monomers or vinyl prepolymers.

3. The polymeric network of claim 2 wherein said vinyl monomers comprise one or more of methyl methacrylate, ethyl methacrylate, 2-ethyl hexyl methacrylate, trimethylolpropane triacrylate, butyl acrylate, isobutyl methacrylate; hydroxy ethyl acrylate, hydroxy propyl acrylate, hydroxy ethyl hexyl acrylate; ethylene glycol dimethacrylate, hexamethylene glycol dimethacrylate; allyl methacrylate, diallyl methacrylate; glycidyl methacrylate, glyceryl propoxytriacrylate; melamine acrylate; diallylphthalate, vinyl acetate, vinyl and vinylidene halides, N-vinyl pyrrolidone, methyl acrylamide, acrylamide, diacetone acrylamide, butadiene, styrene, and vinyl toluene.

4. The polymeric network of claim 1, wherein said ingredients further comprise at least about 0.5% of a UV photosensitizer selected from one or more of a halogenated polynuclear ketone; an organic carbonyl compound selected from alkyl phenones, benzophenones, and tricyclic fused ring compounds; carbonylated phenol nuclear sulfonyl chlorides; a combination of aromatic carbonyl compounds, aromatic aldehydes, or aromatic ketones, and a synergistic sensitizer of about 0.05% to about 3% of 2,2'-dithiobis(benzothiazole).

5. The polymeric network of claim 1, wherein said high temperature stable polymer is one or more of a polyimide, a bismaleimide, a polyester, a polycarbonate, a phenolic, a polyphenylene sulfide, a polyphenylene sulfone, a polyphenyl ether, a polyquinone, a cyanate, or a silicone.

6. The polymeric network of claim 5, wherein said ingredients (b) are selected from a dianhydride and a diamine; a hydroxyamic ester prepolymer; a polyol and a polybasic acid; and mixtures thereof.

7. The polymeric network of claim 1, wherein said ingredients exclude a volatile organic solvent.

8. A method for curing a bimodual-curable formation to form a polymeric network which has an onset degradation temperature that is about 100° C. above the degradation temperature of a base polymer, which comprises the steps of:
   (1) providing a bimodal-curable formulation that is non-emissive upon curing and which comprises the following ingredients:
      (a) a combination of one or more liquid carrier monomers or prepolymers and an ultraviolet (UV) radiation photosensitizer which combination is firstly reacted to form a base polymer by exposure to UV radiation in the presence of said UV photosensitizer at a temperature, $T_{uv}$; and
      (b) between about 10 and 100 wt-% based on ingredient (a) of a combination of one or more monomers or prepolymers which combination is secondly reacted to form a cured high temperature stable polymer by heating at a temperature, $T_\Delta$, wherein ingredient (b) is soluble or dispersible in ingredient (a) at a temperature, $T_s$, and at least one of said monomers or prepolymers forming said cured high temperature stable polymer being modified or blocked to be unreactive at temperatures below about $T_4$ and selected from the group consisting of blocked amine monomers, blocked anhydride monomers, blocked dianhydride monomers, blocked alcohol monomers, and amine-functional silicone resins modified with a maleic anhydride or blocked with a methyl ethyl ketone,
   (2) heating said formulation to temperature, $T_{uv}$;
   (3) exposing said formulation to UV radiation for forming said base polymer; and
   (4) heating said exposed formulation of step (3) to temperature $T_\Delta$ for forming said high temperature stable polymer,
   wherein $T_s$ is equal to or lower than $T_{uv}$, and $T_{uv}$ is at least about 50° C. lower than $T_\Delta$.

9. The method of claim 8, wherein said liquid carrier monomers or prepolymers (a) comprise one or more vinyl monomers or vinyl prepolymers.

10. The method of claim 9 wherein said vinyl monomers comprise one or more of methyl methacrylate, ethyl methacrylate, 2-ethyl hexyl methacrylate, trimethylolpropane triacrylate, butyl acrylate, isobutyl methacrylate; hydroxy ethyl acrylate, hydroxy propyl acrylate, hydroxy ethyl hexyl acrylate; ethylene glycol dimethacrylate, hexamethylene glycol dimethacrylate; allyl methacrylate, diallyl methacrylate; glycidyl methacrylate, glyceryl propoxytriacrylate; melamine acrylate; diallylphthalate, vinyl acetate, vinyl and vinylidene halides, N-vinyl pyrrolidone, methyl acrylamide, acrylamide, diacetone acrylamide, butadiene, styrene, and vinyl toluene.

11. The method of claim 8, wherein said ingredients further comprise at least about 0.5% of a UV photosensitizer selected from one or more of a halogenated polynuclear ketone; an organic carbonyl compound selected from alkyl phenones, benzophenones, and tricyclic fused ring compounds; carbonylated phenol nuclear sulfonyl chlorides; a combination of aromatic carbonyl compounds, aromatic aldehydes, or aromatic ketones, and a synergistic sensitizer of about 0.05% to about 3% of 2,2'-dithiobis(benzothiazole).

12. The method of claim 8 wherein said high temperature stable polymer is one or more of a polyimide, a bismaleimide, a polyester, a polycarbonate, a phenolic, a polyphenylene sulfide, a polyphenylene sulfone, a polyphenyl ether, a polyquinone, a cyanate, or a silicone.

13. The method of claim 12, wherein said ingredients (b) are selected from a dianhydride and a diamine; a hydroxyamic ester prepolymer; a polyol and a polybasic acid; and mixtures thereof.

14. The method of claim 8, wherein said formulation is devoid of volatile organic solvent.

15. The method of claim 8, wherein said formulation is heated to temperature $T_s$ prior to step (2).

* * * * *